Aug. 28, 1962     C. F. BOESTER     3,051,315
SEWAGE TREATMENT APPARATUS
Filed Aug. 1, 1957
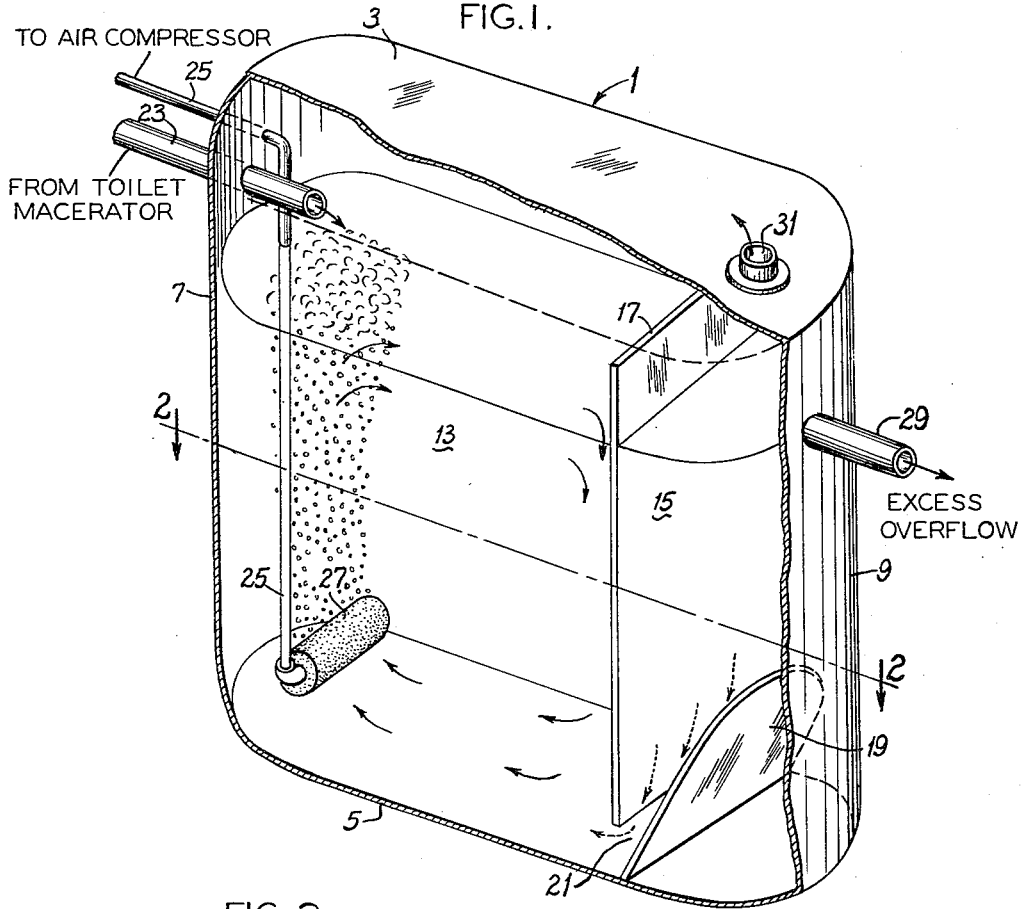
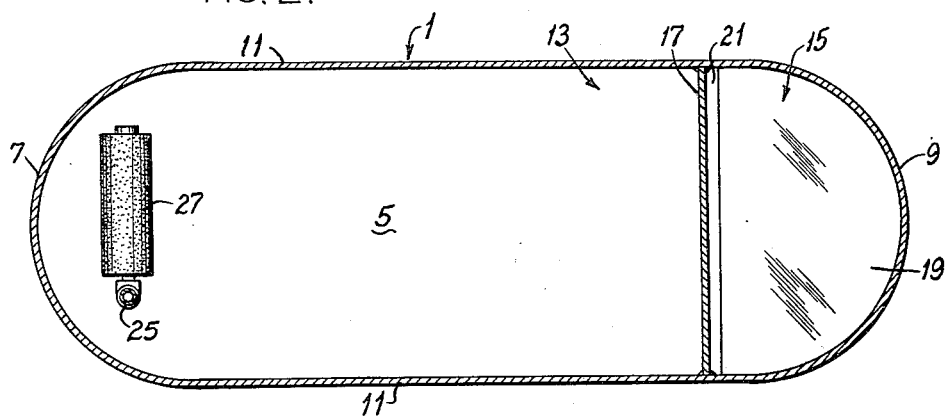

United States Patent Office
3,051,315
Patented Aug. 28, 1962

3,051,315
SEWAGE TREATMENT APPARATUS
Carl F. Boester, Arlington, Va.
(404 North St., Lafayette, Ind.)
Filed Aug. 1, 1957, Ser. No. 675,748
1 Claim. (Cl. 210—195)

This invention relates to sewage treatment and more particularly to apparatus and methods for treating decomposable waste materials.

Among the several objects of this invention may be noted the provision of apparatus which will convert a decomposable waste-water mixture into an inoffensive aqueous effluent; the provision of methods for processing sewage which quickly and effectively converts a decomposable waste-water mixture into a clarified inoffensive aqueous effluent; and the provision of apparatus of the class described which may be economically constructed and is reliable in operation. Other objects and features will be in part apparent and in part pointed out hereinafter.

The invention accordingly comprises the constructions and methods hereinafter described, the scope of the invention being indicated in the following claims.

In the accompanying drawings, in which one of various possible embodiments of the invention is illustrated, FIG. 1 is a perspective of a sewage processing apparatus of the present invention with parts broken away; and, FIG. 2 is a horizontal cross section on line 2—2 of FIG. 1.

Corresponding reference characters indicate corresponding parts throughout the several views of the drawings.

Referring now more particularly to the drawings, a tank used in the sewage processing or treatment apparatus of the present invention is generally illustrated by reference numeral 1. This tank comprises a top closure 3, a bottom closure 5, two curved end walls 7 and 9 and side walls 11. The tank is generally elongate or elliptical in cross section and is divided into a first compartment 13 and second compartment 15 by vertical baffle 17 which is welded along its side edges to the interior surfaces of the side walls 11.

The first compartment serves for the oxidation of carbonaceous material and for the deposit of a relatively small portion of ash. The second compartment serves for quiescent liquid from which solids have been eliminated and the discharge of innocuous effluent from its upper end. The upper edge of the baffle is spaced below the under surface of top closure 3, and the lower edge of the baffle is spaced above the tank bottom 5. Compartment 15 has an inclined baffle plate 19 affixed to the interior of end wall 9 thus forming a sloping bottom for this compartment which declines toward a passageway 21 defined by the lower edge of baffle 17 and the tank bottom 5.

A pipe 23 is connected to the upper portion of compartment 13. This pipe is connected to a sewage macerator disposed below a toilet bowl and into which human waste and water are discharged. Such toilet and macerator apparatus is disclosed in detail in my Patents 2,798,22 and 2,798,228, grant July 9, 1957. A second pipe 25 is connected from an air compressor to an air diffuser head 27. Head 27 is preferably formed from a cylinder of a foraminous stone material closed at the end opposite that to which the pipe 25 is connected so as to form a vertical curtain of tiny air bubbles which course upwardly through compartment 13. This diffuser head is positioned closely adjacent end wall 7 and also closely adjacent tank bottom 5. Head 27 is elongate and extends transversely.

A second pipe 29 is connected through end wall 9 into the upper portion of compartment 15. The placement of this pipe 29 will establish the surface level of the aqueous fluid in the tank at a predetermined distance below the top closure 3. A fitting 31 serves as a breather or vent for tank 1 and is in gaseous connection with both compartments 13 and 15.

Operation is as follows:

Waste which is deposited into a toilet bowl is flushed with water and macerated to form a comminuted waste and water mixture which is discharged into compartment 13 via pipe 23. The multitude of small air bubbles in the form of minute streamlets which are formed continuously by air diffusing head 27 courses upwardly along the inside of compartment 13 adjacent end wall 7. The air bubbles continuously agitate the contents of compartment 13 and facilitate an aerobic decomposition of the decomposable organic waste materials suspended therein. The raise of these air bubbles to the upper surface of compartment 13, predominantly at the left end of tank 1, induces a generally vertical circular current of water motion in this compartment as indicated by the arrows. This circulatory current round and round increases turbulence and agitation for the purpose of keeping the particles of carbonaceous material in suspension until it is digested.

The motion of the water downwardly and away from the passageway 21 in compartment 13 effects a mild aspirating action at this point. That is, a slight negative pressure on the contents of compartment 15 is thus effected. The compartment 13 therefore serves as an aerating and processing compartment for the waste materials while compartment 15, because of its quiescent nature, functions as a settling compartment. The transfer of liquid from the bottom of compartment 13 into compartment 15 is effected by the fluid head in the former compartment. As any finely divided particles which may be suspended in compartment 15 tend to settle out, the negative pressure applied at passageway 21 hastens this settling action so that the particles settle downwardly and are deflected by baffle plate 19 (as shown by the dotted darts) so as to be returned to compartment 13 through passageway 21.

Any excess overflow from pipe 29 is therefore a clear and inoffensive effluent which is equal or superior in character to the effluent from a carefully designed and properly operated municipal sewage treatment plant, and may be handled and disposed of in the same fashion that effluent from aerobic sewage treatment plants is normally handled. For example, it may be discharged into a drain field, or may be returned as flushing fluid to the toilet bowl, or may be introduced into a community storm sewer system.

The tank is preferably constructed from steel and coated on its interior surface with an asphaltic composition. It is also preferred that the volume of compartment 15 be approximately one third that of the volume of compartment 13.

It is to be understood that in addition to discharging only comminuted human waste material and water into compartment 13, other household waste-water mixtures such as from the bath and kitchen sink, etc., can also be combined therewith (as is shown in my Patent 2,798,228) and carried by pipe 23 to compartment 13.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

I claim:

A household sewage treatment apparatus comprising a tank unit having outer end walls spaced widely apart, an upright partition extending across the tank from the top thereof to near the bottom thereof and positioned substantially nearer to one end wall than the other and dividing the tank into a primary aerating compartment and a substantially smaller secondary settling compartment, the primary compartment having a substantially horizontal bottom wall and the secondary compartment having a bottom wall inclined from the outer end wall of the secondary compartment downwardly toward the primary compartment and with its lowermost portion meeting said primary compartment bottom wall along a line in substantial vertical alignment with and spaced below the lower edge of said partition to provide a permanently open restricted passageway of predetermined fixed area between said compartments, there being an inlet for a sewage-water mixture into the upper portion only of said primary compartment, there being an outlet means from the upper portion only of the secondary compartment, means for discharging air bubbles to the primary compartment along the bottom of its outer end wall and upwardly thereof to aerate the sewage-water mixture in the primary compartment and induce a generally vertically circular uniform current of the sewage-water mixture in said primary compartment moving downwardly continuously along said partition and past said passageway and then along the bottom wall of said primary compartment toward said remote outer wall of the latter and thereby effecting a continuous aspiration action on any solid particles settling toward the lowermost part of said secondary compartment bottom wall and adjacent said passageway, and drawing such particles into said primary compartment for exposure to air bubbles therein, thereby effecting aerobic decomposition of all the carbonaceous waste in the single primary compartment while freeing the liquid in the single secondary compartment of solids and maintaining it clear and inoffensive and substantially quiescent except for upward flow of the liquid under gravity pressure to said outlet means in the upper portion of the secondary compartment.

References Cited in the file of this patent

UNITED STATES PATENTS

| | | |
|---|---|---|
| 691,365 | Dittler | Jan. 21, 1902 |
| 1,139,024 | Frank | May 11, 1915 |
| 1,286,017 | Jones | Nov. 26, 1918 |
| 2,413,838 | Mallory | Jan. 7, 1947 |
| 2,430,519 | Mallory | Nov. 11, 1947 |
| 2,473,323 | Zack | June 14, 1949 |
| 2,628,190 | Langdon | Feb. 10, 1953 |
| 2,647,870 | Kelly et al. | Aug. 4, 1953 |
| 2,798,228 | Boester | July 9, 1957 |

FOREIGN PATENTS

| | | |
|---|---|---|
| 466,024 | Germany | Oct. 1, 1928 |